(12) United States Patent
Gao et al.

(10) Patent No.: US 12,327,079 B2
(45) Date of Patent: Jun. 10, 2025

(54) METHOD FOR EDITING THIRD-PARTY'S CONTENT IN A DOCUMENT AND APPARATUS, COMPUTER DEVICE, AND STORAGE MEDIUM

(71) Applicant: Tencent Technology (Shenzhen) Company Limited, Shenzhen (CN)

(72) Inventors: Fu Gao, Shenzhen (CN); Qinghong Liu, Shenzhen (CN); Linxi Liu, Shenzhen (CN); Yuanyuan Hong, Shenzhen (CN); Guangmin Huang, Shenzhen (CN); Yandongfang He, Shenzhen (CN); Jiaqi Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 262 days.

(21) Appl. No.: 17/978,908

(22) Filed: Nov. 1, 2022

(65) Prior Publication Data
US 2023/0046716 A1 Feb. 16, 2023

Related U.S. Application Data

(63) Continuation of application No. PCT/CN2021/116695, filed on Sep. 6, 2021.

(30) Foreign Application Priority Data

Sep. 28, 2020 (CN) .......................... 202011045860.9

(51) Int. Cl.
*G06F 40/166* (2020.01)
*G06F 40/134* (2020.01)
*G06F 3/0482* (2013.01)

(52) U.S. Cl.
CPC .......... *G06F 40/166* (2020.01); *G06F 40/134* (2020.01); *G06F 3/0482* (2013.01)

(58) Field of Classification Search
None
See application file for complete search history.

(56) References Cited

U.S. PATENT DOCUMENTS

| 8,307,119 B2 * | 11/2012 | Rochelle | G06F 16/93 709/248 |
| 8,666,961 B1 * | 3/2014 | Qureshi | G06F 16/24 707/769 |

(Continued)

FOREIGN PATENT DOCUMENTS

| CN | 101454774 A | 6/2009 |
| CN | 103907110 A | 7/2014 |

(Continued)

OTHER PUBLICATIONS

Tencent Technology, WO, PCT/CN2021/116695, Nov. 26, 2021, 6 pgs.

(Continued)

*Primary Examiner* — Maikhanh Nguyen
(74) *Attorney, Agent, or Firm* — Morgan, Lewis & Bockius LLP

(57) ABSTRACT

A document editing method includes: displaying a shared document page including content of a target shared document and description information of document insertion content. The target shared document and the document insertion content are from different content platforms. The method includes displaying a link editing page of the document insertion content in response to an editing operation on the description information of the document insertion content; acquiring target link address information edited through the link editing page; and updating the document (Continued)

insertion content to target content corresponding to the target link address information.

16 Claims, 9 Drawing Sheets

(56) References Cited

U.S. PATENT DOCUMENTS

| | | | |
|---|---|---|---|
| 9,606,972 B2* | 3/2017 | Filman | G06Q 10/10 |
| 10,409,901 B2* | 9/2019 | Kikin-Gil | G06Q 10/107 |
| 11,232,250 B2* | 1/2022 | Srinivasan | G06F 40/279 |
| 11,275,888 B2* | 3/2022 | Han | G06F 40/30 |
| 2007/0233811 A1 | 10/2007 | Rochelle et al. | |
| 2014/0310613 A1* | 10/2014 | Megiddo | G06F 3/04842 715/753 |
| 2014/0341476 A1 | 11/2014 | Kulick et al. | |
| 2014/0344658 A1 | 11/2014 | Srinivasan et al. | |
| 2017/0147545 A1 | 5/2017 | Amoli et al. | |
| 2021/0141993 A1* | 5/2021 | Han | G06F 40/30 |

FOREIGN PATENT DOCUMENTS

| | | |
|---|---|---|
| CN | 108112270 A | 6/2018 |
| CN | 109492210 A | 3/2019 |
| CN | 109918345 A | 6/2019 |
| CN | 110046309 A | 7/2019 |
| CN | 110162758 A | 8/2019 |
| CN | 110175302 A | 8/2019 |
| CN | 111581922 A | 8/2020 |
| CN | 111651418 A | 9/2020 |
| CN | 112632919 A | 4/2021 |
| KR | 101815924 B1 | 1/2018 |
| KR | 101950422 B1 | 2/2019 |

OTHER PUBLICATIONS

Tencent Technology, IPRP, PCT/CN2021/116695, Mar. 28, 2023, 7 pgs.
Tencent Technology (Shenzhen) Company Limited, EESR, EP 21871260.2, Sep. 15, 2023, 11 pgs.
Keeler, Alice, "Embedding Google Documents in a Google Site", Techer Tech, XP093073580, retrieved from the internet on Aug. 14, 2023, https://web.archive.org/web/20200423175753/https://alicekeeler.com/2013/05/20/embedded-google-documents-in-a-google-site/.
Tencent Technology, ISR, PCT/CN2021/116695, Nov. 26, 2021, 3 pgs.
Anonymous, "How to Add Links in Tencent Docs Slides", iefans.net, Aug. 5, 2020, 4 pgs., Retrieved from the Internet: https://www.iefans.net//a/v1055881.html.

* cited by examiner

METHOD FOR EDITING THIRD-PARTY'S CONTENT IN A DOCUMENT AND APPARATUS, COMPUTER DEVICE, AND STORAGE MEDIUM

CROSS-REFERENCE TO RELATED APPLICATIONS

This application is a continuation application of PCT Patent Application No. PCT/CN2021/116695, entitled "DOCUMENT EDITING METHOD AND APPARATUS, COMPUTER DEVICE AND STORAGE MEDIUM" filed on Sep. 6, 2021, which claims priority to Chinese Patent Application No. 202011045860.9, filed with the State Intellectual Property Office of the People's Republic of China on Sep. 28, 2020, and entitled "DOCUMENT EDITING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and specifically, to a document editing method and apparatus, a computer device, and a storage medium.

BACKGROUND OF THE DISCLOSURE

Online documents are often used for multi-person collaboration to produce and manage some rich media resources, such as pictures, sound recordings, and videos. After all the collaborators have finished processing on an online document, the online document can be stored in a server for users to use.

Currently, after content from another content platform is inserted into the online document, if a user intends to modify the content, the user generally deletes the content, and then performs a content insertion operation again to insert new content into the online document.

SUMMARY

According to various embodiments of this application, a document editing method and apparatus, a computer device, and a storage medium are provided.

A document editing method is provided, performed by a computer device, the method including:
  displaying a shared document page including content of a target shared document and description information of document insertion content, the target shared document being capable of being operated simultaneously or non-simultaneously by at least two users having permissions, the target shared document and the document insertion content being from different content platforms;
  in response to an editing operation on the description information of the document insertion content, displaying a link editing page of the document insertion content;
  acquiring target link address information edited through the link editing page; and
  updating the document insertion content to target content corresponding to the target link address information.

An embodiment of the present disclosure provides a document editing apparatus, including:
  a shared document page display unit, configured to display a shared document page, the shared document page including content of a target shared document and description information of document insertion content, the target shared document being capable of being operated simultaneously or non-simultaneously by at least two users having permissions, the target shared document and the document insertion content being from different content platforms;
  an edition triggering unit, configured to display a link editing page of the document insertion content in response to an editing operation on the description information of the document insertion content;
  a link acquisition unit, configured to acquire target link address information edited through the link editing page; and
  a content update unit, configured to update the document insertion content to target content corresponding to the target link address information.

A computer device is provided, including a memory, a processor, and a computer program stored in the memory and executable on the processor, the processor, when executing the computer program, implementing the operations of the method described above.

A storage medium is provided, storing a computer program, the computer program, when run on a computer device, causing the computer device to perform the operations of the method described above.

A computer program product or computer program is provided, the computer program product or computer program including computer instructions, the computer instructions being stored in a computer-readable storage medium; and when a processor of a computer device reads the computer instructions from the computer-readable storage medium and executes the computer instructions, the computer device is caused to perform the operations of the method described above.

Details of one or more embodiments of this application are provided in the subsequent accompanying drawings and descriptions. Other features and advantages of this application become clearer from the specification, the accompanying drawings, and the claims.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person skilled in the art based on the embodiments of the present disclosure without creative efforts shall fall within the protection scope of the present disclosure.

The embodiments of the present disclosure provide a document editing method and apparatus, a computer device, and a storage medium.

This embodiment provides a document editing system, including a terminal, a shared document server that provides a shared document service for the terminal, and a third-party content server. The terminal may be integrated with a shared document client, and a user may access the shared document server through the shared document client, and edit a shared document stored in the shared document server. Alternatively, the user may access the shared document server on the terminal in a manner of a web page or the like.

The third-party content server is a server of a content platform, and the content platform can provide the user with content, including but not limited to: a video, an audio, an image, a shopping service, and the like. The third-party content server in this embodiment is a content server different from the shared document server.

The terminal may be a mobile terminal such as a mobile phone, a tablet computer, a notebook computer, or an intelligent in-vehicle, or may be a fixed terminal such as a smart television or a desktop computer.

The server in this embodiment may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Figure 1A:
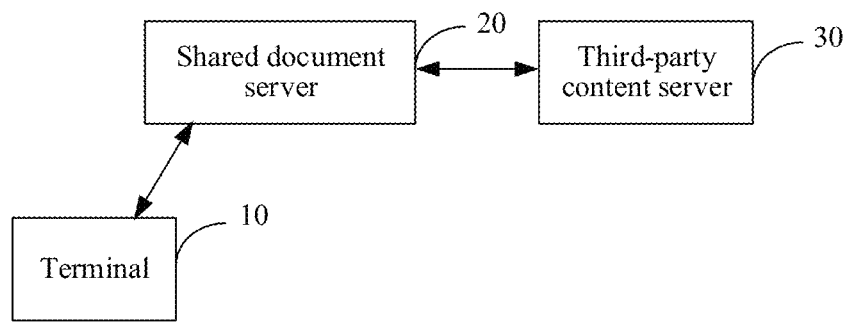
FIG. 1A is a schematic structural diagram of a document editing system according to an embodiment of the present disclosure.

Referring to FIG. 1A, the document editing system provided in this embodiment includes a terminal 10, a shared document server 20, a third-party content server 30 (the quantity of third-party content servers is not limited, and there may be a plurality of third-party content servers), and the like. The terminal 10, the shared document server 20, and the third-party content server 30 are connected through a network, for example, through a wired or wireless network.

The terminal 10 can be configured to: display a shared document page, the shared document page including content of a target shared document and description information of document insertion content, the target shared document being capable of being operated simultaneously or non-simultaneously by at least two users having permissions, the target shared document and the document insertion content being from different content platforms; display a link editing page of the document insertion content in response to an editing operation on the description information of the document insertion content; acquire target link address information edited through the link editing page; and update the document insertion content to target content corresponding to the target link address information.

The shared document page may be generated based on page information provided by the shared document server 20 for the terminal 10. The target shared document is stored in the shared document server 20.

In the step of updating the document insertion content to target content corresponding to the target link address information, the terminal 10 may access the third-party content server 30 corresponding to the link address information based on the target link address information, acquire the target content corresponding to the target link address information from the third-party content server 30, and update the document insertion content to the target content corresponding to the target link address information.

Detailed descriptions are separately provided below. A description order of the following embodiments is not intended to limit preference orders of the embodiments.

Figure 1B:
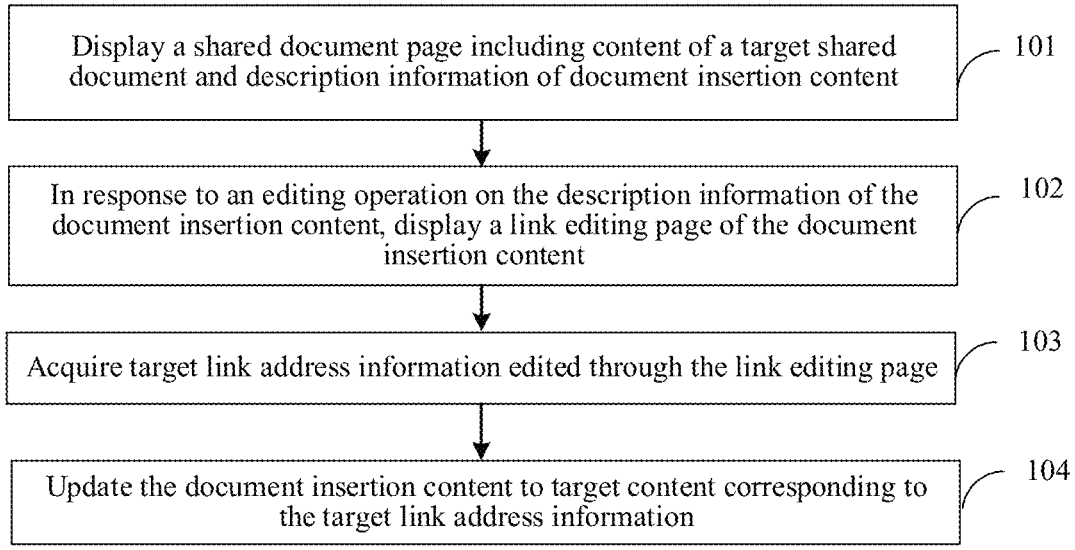
FIG. 1B is a flowchart of a document editing method according to an embodiment of the present disclosure.

An embodiment of the present disclosure provides a document editing method. The method may be executed by a terminal, or may be jointly performed by a terminal and a server. This embodiment of the present disclosure is described by using an example in which the method is performed by a terminal. As shown in FIG. 1B, the procedure of the document editing method may be as follows:

101: Display a shared document page, the shared document page including content of a target shared document and description information of document insertion content, the target shared document and the document insertion content being from different content platforms.

The target shared document is capable of being operated simultaneously or non-simultaneously by at least two users having permissions.

In this embodiment, the related functions of the shared document are provided by a shared document platform. A shared document client program may be installed on a terminal side. A user may log in to the shared document platform through the shared document client program to operate a shared document in a platform account. In another example, the user may log in to the shared document platform through a browser and operate a shared document in the platform account of the user.

In this embodiment, the shared document platform corresponds to a shared document server, and the shared document server may be configured to provide users with services related to shared documents. The shared document server may store all shared documents of users of the shared document platform. A user may create a shared document in the shared document server by logging in to the shared document platform, or edit a shared document in the shared document server.

The shared document platform in this embodiment may be a cloud platform, and the shared document server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

The shared document platform in this embodiment and the multi-user simultaneous or non-simultaneous operations of a shared document may be implemented based on the cloud technology. The cloud technology is a hosting technology that unifies a series of resources such as hardware, software, and networks in a wide area network or a local area network to implement computing, storage, processing, and sharing of data.

Specifically, the implementation of the shared document and the online operations on the shared document in this embodiment may be implemented based on the cloud storage technology in the cloud computing technology. Cloud storage is a new concept extended and developed from the cloud computing concept. A distributed cloud storage system (which is referred to as a storage system for short below) refers to a storage system gathering a large quantity of different types of storage devices (the storage devices are also referred to as storage nodes) in the network to work together through application software or application interfaces based on functions such as a cluster application, a grid technology, and a distributed storage file system, to jointly provide data storage and service access functions to the outside.

In this embodiment, storage of the shared document platform for shared documents created by users of the shared document platform may be implemented based on the cloud storage technology. Various storage devices in the shared document server of the shared document platform may gather to work together based on the cloud storage technology to form a large cloud storage system, to jointly provide document storage and service access functions for users of the shared document platform.

For example, the shared document platform may allocate corresponding user storage space for platform users in the cloud storage system. In some embodiments, when user storage space is allocated, a distance between a storage device and a login location of a cloud platform user may be used as reference information required for allocation, to allocate storage space corresponding to a storage device relatively close (for example, closest) to the login location to the platform user.

The shared document in this embodiment may alternatively be understood as an online document, and the editing mode of the shared document includes online editing. A user may log in to the shared document platform through a client or browser, and then create a shared document. After the shared document is created, the created shared document is stored on the shared document platform, and users may perform operations such as editing in the shared document. In the editing process of the shared document, information edited by the users in the shared document is transmitted to the shared document platform in real time to update the shared document, thereby implementing online editing of the shared document.

In this embodiment, users having permissions refer to users having online operation permissions for shared documents. The online operation permission includes, but not limited to, an editing permission.

The target shared document in this embodiment can be operated simultaneously or non-simultaneously by at least two users having permissions, but it may be understood that the users having permissions corresponding to the target shared document are not limited to at least two. When there are at least two users having permissions for the target shared document, these users having permissions can operate the target shared document simultaneously or non-simultaneously.

For example, there may be only one user having permissions for the target shared document. For example, a shared document A on the shared document platform is created by a user A, and the user A is a user having an operation permission for the shared document A. When the user A does not share the shared document with other users on the shared document platform through the shared document platform, the user A is the only user having an operation permission for the shared document A.

In other examples, there may be at least two users having permissions for a shared document, and when there are at least two users having permissions for the shared document, the shared document can be operated by all the users having permissions simultaneously or non-simultaneously. For example, if the user A in the previous example shares the shared document A with users B and C on the shared document platform, all of the users A, B, and C are users having an operation permission for the shared document A, and the users A, B, and C can all log in to their own shared document platform accounts, and then enter an editing page of the shared document A through the accounts, to edit the shared document A. It may be understood that editing of each user on the shared document A can update content of the shared document A on the shared document platform. If the users A, B, and C simultaneously edit the shared document A, information edited by the users A, B, and C in the shared document A can simultaneously update the shared document A. After the updating, the shared document A displayed on a terminal of each user includes the content edited by the three users.

In this embodiment, the document type of the shared document is not limited, which may be, for example, an image-text document, a table type document, or a PowerPoint (PPT) type document. For shared documents of different document types, the types of content that can be added to the documents are not limited, and the types include, but not limited to: text, images, videos, audios, multimedia content, and the like. The multimedia content refers to content obtained by combining content in two or more media forms. The media forms may include text, image, audio and other forms.

For example, the content can be understood as the content inputted in the target shared document by the user in manners such as text editing, image reproduction, and image drawing, and the document insertion content can be understood as content obtained from a content platform different from the shared document platform.

The form of the document insertion content is not limited, and the document insertion content may be a video, a word file, a web page, a code file, or the like.

In this embodiment, the description information of the document insertion content may include the document insertion content and link address information of the document insertion content, where the link address information may be linked to the document insertion content. The link address information may be understood as link address information of the document insertion content on the content platform thereof, for example, link address information of a video A from an XX video platform on the XX video platform.

For example, the shared document page may be a document editing page of the target shared document. On the document editing page, the user can perform an operation on the target shared document, for example, modifying the content in the target shared document.

Before step 101, content from another content platform may be inserted into the target shared document through a content insertion operation.

In some embodiments, before step 101, the method may further include:
  displaying the shared document page, the shared document page including the content of the target shared document;
  in response to a content insertion operation on the target shared document, displaying a content platform list on the shared document page, the content platform list including at least one candidate content platform;
  in response to detecting a selection operation on a target content platform, displaying a content insertion subpage;
  acquiring link address information edited through the content insertion subpage, and acquiring description information of document insertion content to which the link address information is linked; and
  inserting the description information of the document insertion content into the shared document page.

In this embodiment, the content insertion subpage may be displayed in the form of a window, a floating layer, a sidebar, or the like, which is not limited in this embodiment.

The candidate content platform in this embodiment is a content platform different from the shared document platform. The type of the content platform is not limited, and it may be a platform for providing users with multimedia content (such as video information and audio information), a platform for users to conduct transactions with platform merchants, or a platform for users to perform professional file editing, for example, application code editing.

For example, the description information of the document insertion content may include the document insertion content, may also include link address information of the document insertion content, and may further include text description information of the document insertion content, that is, information describing the document insertion content in the form of text.

For example, the inserting the description information of the document insertion content into the shared document page may include:
  generating an inline component, and inserting the inline component into the target shared document; and
  inserting the description information of the document insertion content into the inline component.

When the description information of the document insertion content includes text description information, the text description information may be inserted into the target shared document not in an inline component manner, but the link address information corresponding to the document insertion content is added to the text description information, and then the text description information linked with the link address information is added to the target shared document. Specifically, the text description information may be displayed near the inline component.

For example, the method in this embodiment further includes: in response to detecting a link triggering operation on the text description information, jumping to display a web page corresponding to the link address information to which the text description information is linked. It may be understood that the displayed web page is a web page on the content platform corresponding to the link address information.

The link triggering operation may be an operation such as a click operation, a double-click operation, or a long-press operation, which is not limited in this embodiment.

In this embodiment, the document insertion content may be content such as a web page, a video, or an image. The display region of the inline component may be recorded as an insertion content presentation region, and the document insertion content in the inline component can provide users with the functions of the document insertion content on the content platform in the insertion content presentation region. For example, the document insertion content is a web page, then in the target shared document, the user can perform a web page operation supported by a content platform of the web page in the inline component.

In some embodiments, the method in this embodiment further includes: presenting the document insertion content within the insertion content presentation region in a case that a content presentation operation on the description information of the document insertion content is detected.

For example, in a case that the document insertion content is a video, when a playback operation on the video is detected, the video is played within the insertion content presentation region.

In some embodiments, the subpage in this embodiment may be presented in the form of a window, a floating layer, a sidebar, or the like, which is not limited in this embodiment.

In this embodiment, the content insertion operation may be an operation including a series of operations, where a name of a candidate content platform may be displayed in the content platform list.

For example, the shared document page includes a document editing toolbar region, and the document editing toolbar region may be displayed on the top of the shared document page, or displayed in the shared document page in the form of a sidebar or the like. The document editing toolbar region includes a plurality of document editing controls, where functions of different document editing controls are different.

In some embodiments, the document editing controls include a content insertion control that can be configured to perform content insertion management.

The step "in response to a content insertion operation on the target shared document, displaying a content platform list on the shared document page" may include:
  in response to detecting a content insertion operation on the content insertion control, displaying a content insertion management control list on the shared document page, the content insertion management control list including a content platform selection control; and
  in response to a triggering operation on the content platform selection control, displaying the content platform list on the shared document page.

In some embodiments, in another example, the shared document page may further include a sidebar control region. The region may include some commonly used (or user-customized and selected) controls. In some embodiments, the sidebar control region includes: a content platform selection control.

The step "in response to a content insertion operation on the target shared document, displaying a content platform list on the shared document page" may include: in response to detecting a triggering operation on the content platform selection control, displaying the content platform list on the shared document page.

For example, the content platform selection control may alternatively be displayed through a shortcut key operation. The shortcut key operation includes, but not limited to, a keyboard shortcut key operation, or a mouse shortcut key operation, or the like.

In some embodiments, the step "in response to detecting a content insertion operation on the target shared document, displaying a content platform list on the shared document page" may include:

in response to detecting a preset shortcut key operation on the target shared document, displaying a function control list including a content platform selection control; and in response to detecting a triggering operation on the content platform selection control, displaying the content platform list on the shared document page.

The solution for inserting content into the target shared document through the document editing toolbar region on the top of the shared document page is described below in detail with reference to FIG. 2A and FIG. 3A.

Figure 2A:
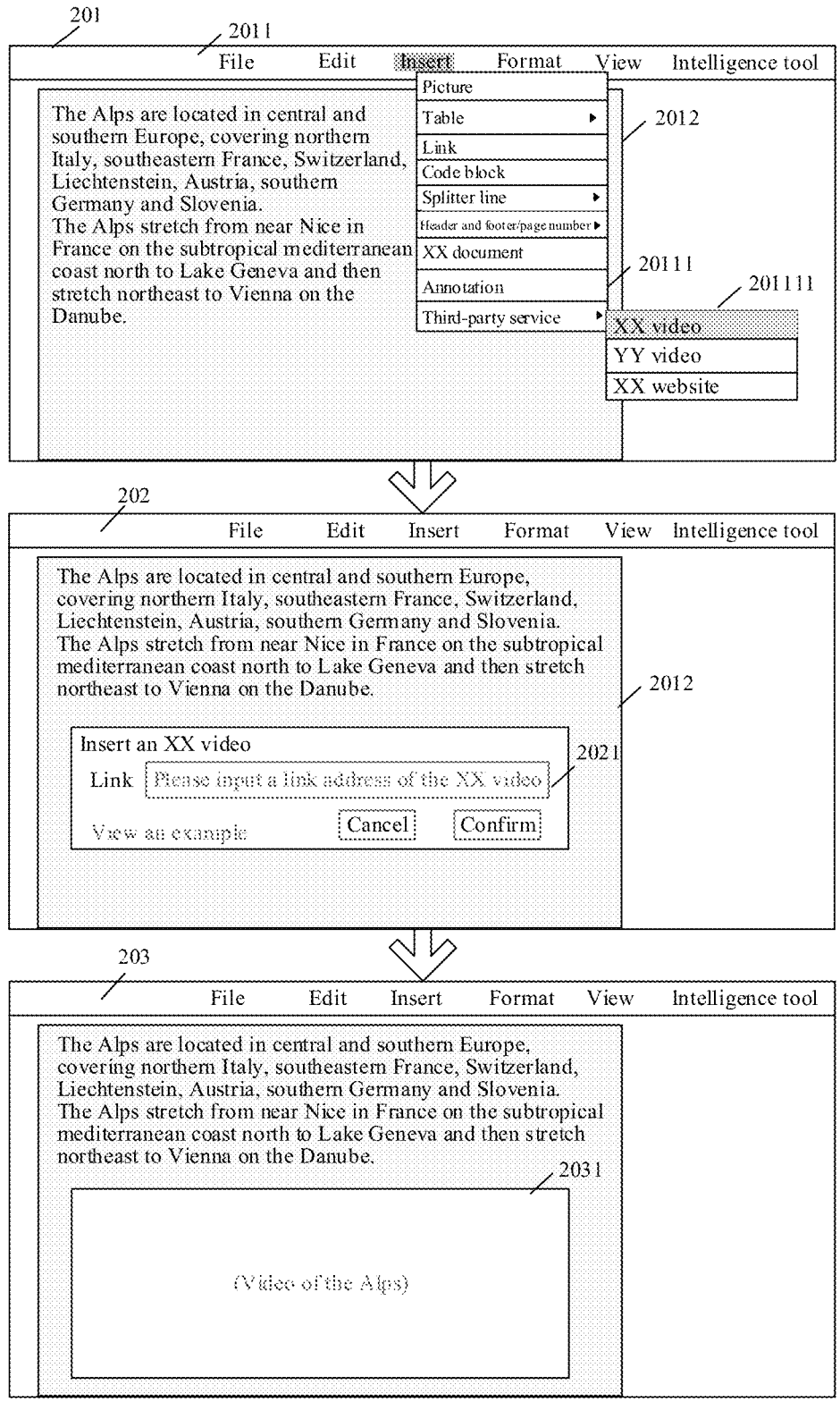
FIG. 2A is a schematic diagram of inserting document insertion content into a shared document page according to an embodiment of the present disclosure.

Referring to FIG. 2A, 201 indicates a shared document page, the top of the page includes a document editing toolbar region 2011 and a target shared document 2012, and the document editing toolbar region includes controls named "File", "Edit", "Insert", "Format", and the like. The content insertion control is a control named "Insert". When a triggering operation (such as a click operation or a double-click operation) on the "insert" control is detected, a content insertion management control list 20111 is displayed, the content insertion management control list including the content platform selection control, for example, a control named "third-party service"; and when a triggering operation on the "third-party service" control is detected, a content platform list 201111 is displayed, names of candidate content platforms provided by the shared document platform, such as "XX video", "YY" video", and "XX website" being displayed in the content platform list.

In response to detecting a selection operation on "XX video", a content insertion subpage (referring to 2021 in page 202 in FIG. 2A) is displayed. The content insertion subpage is displayed on the shared document page in the form of a window. The content insertion subpage 2021 includes a link input control (which may be an input box), a cancel control, and a confirmation control. The user may input the link address information in the link input control. When a triggering operation on the confirmation control is detected, the link address information inputted by the user through the link input control is acquired, the description information of the document insertion content is acquired based on the link address information, and the description information of the document insertion content is inserted into the shared document page (refer to the shared document page indicated by 203).

Figure 3A:
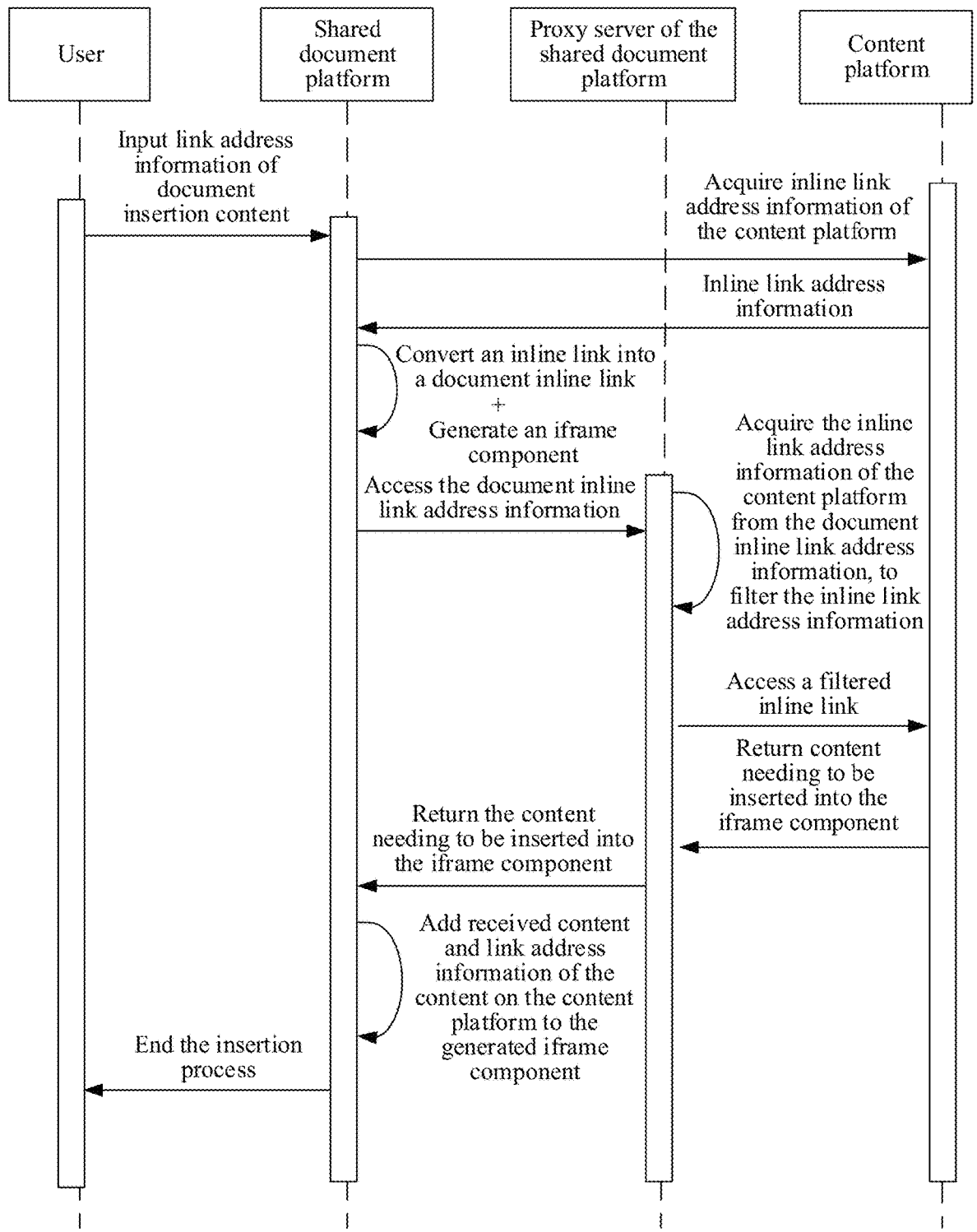
FIG. 3A is a schematic flowchart of inserting document insertion content into a shared document page according to an embodiment of the present disclosure.

For the process of acquiring the link address information inputted by the user through the link input control to acquiring the description information of the document insertion content based on the link address information, reference may be made to the flowchart shown in FIG. 3A.

Referring to FIG. 3A, the process of inserting the description information of the document insertion content into the target shared document may include:

after the user inputs the link address information through the terminal, accessing, by the shared document platform, a content website corresponding to the link address information based on the link address information, to acquire inline link address information corresponding to the link address information from the content website;

generating, by the shared document platform, an inline component, and inserting the inline component into the target shared document;

converting the inline link address information into document inline link address information, where the inline component may be an iframe component, and the document inline link address information is link address information that can be responded, parsed, and processed by a proxy server;

transmitting a content acquisition request including the document inline link address information to the proxy server;

parsing, by the proxy server, the inline link address information of the content platform from the document inline link address information;

determining, by the proxy server based on a preset inline link filtering rule, whether the inline link address information is inline link address information that meets a constraint condition, and acquiring, in a case that it is determined that the inline link address information is inline link address information that meets the constraint condition and based on the inline link address information, content needing to be inserted into the inline component from the content platform;

transmitting, by the proxy server, the content needing to be inserted into the inline component to the shared document platform; and receiving, by the shared document platform, the content, and inserting the content and link address information of the content into the inline component.

The content insertion subpage may further include a display attribute setting control for the document insertion content. The user may set display attributes of the document insertion content through the display attribute setting control. The display attributes include, but not limited to, a display size and an insertion manner (such as a tight type and a wrap type in word). The document insertion content is displayed in the inline component, so that the display attributes of the document insertion content may also be understood as display attributes of the inline component.

Before the shared document platform accesses the content website corresponding to the link address information based on the link address information, whether the link address information is link information of the target content platform of the shared document platform may further be detected. When it is detected that the link address information is link information of the target content platform of the shared document platform, the step "accessing, by the shared document platform, a content website corresponding to the link address information based on the link address information" continues to be performed; otherwise, content insertion failure prompt information is displayed on the shared document platform.

The target content platform may be a preset platform that provides content such as text, images, and videos that meets the constraint condition. Text that meets the constraint condition may refer to articles without remarks of discrimination, slander, or endangering public safety.

Whether the link address information is link information of the target content platform of the shared document platform may be detected through string matching. For example, a preset matching character string is set based on the link address information of the target content platform of the shared document platform. Only when the link address information includes the preset matching character string, it is determined that the link address information is link address information of the target content platform of the shared document platform; otherwise, it is determined that the link address information is not link address information of the target content platform of the shared document platform.

Because the content insertion subpage is triggered by the selection operation on the target content platform, the process of detecting the link address information may specifically include: detecting whether the link address information is link address information of the target content platform of the shared document platform.

For example, whether the link address information is link address information of the target content platform of the shared document platform may alternatively be detected in the manner of a regular expression. A corresponding regular expression may be set for issued link information of each target content platform, and whether the link address information meets requirements of the regular expression is detected. If the link address information meets the requirements, the detected link address information is link address information of the target content platform of the shared document platform; and if the link address information does not meet the requirements, the detected link address information is not link address information of the target content platform of the shared document platform.

The preset inline link filtering rule may be set based on the foregoing preset matching character string and regular expression, which is not limited in this embodiment.

In this embodiment, in addition to the inline component, content on the content platform may alternatively be inserted into the target shared document in another manner, for example, a div tag manner, which is not limited in this embodiment.

For example, after the step "acquiring link address information edited through the content insertion subpage, and acquiring description information of document insertion content to which the link address information is linked", the method may further include:

displaying loading prompt information of the document insertion content in the insertion content presentation region of the target shared document.

The insertion content presentation region may be generated based on the display attributes of the document insertion content inputted through the content insertion subpage. For example, the insertion content presentation region is generated based on the display size.

In the solution of inserting the document insertion content by using the inline component, an inline component may be generated first in the shared document based on the link address information and display attributes of the document insertion content, and the loading prompt information of the document insertion content may be displayed in the display region of the inline component.

Figure 2B:
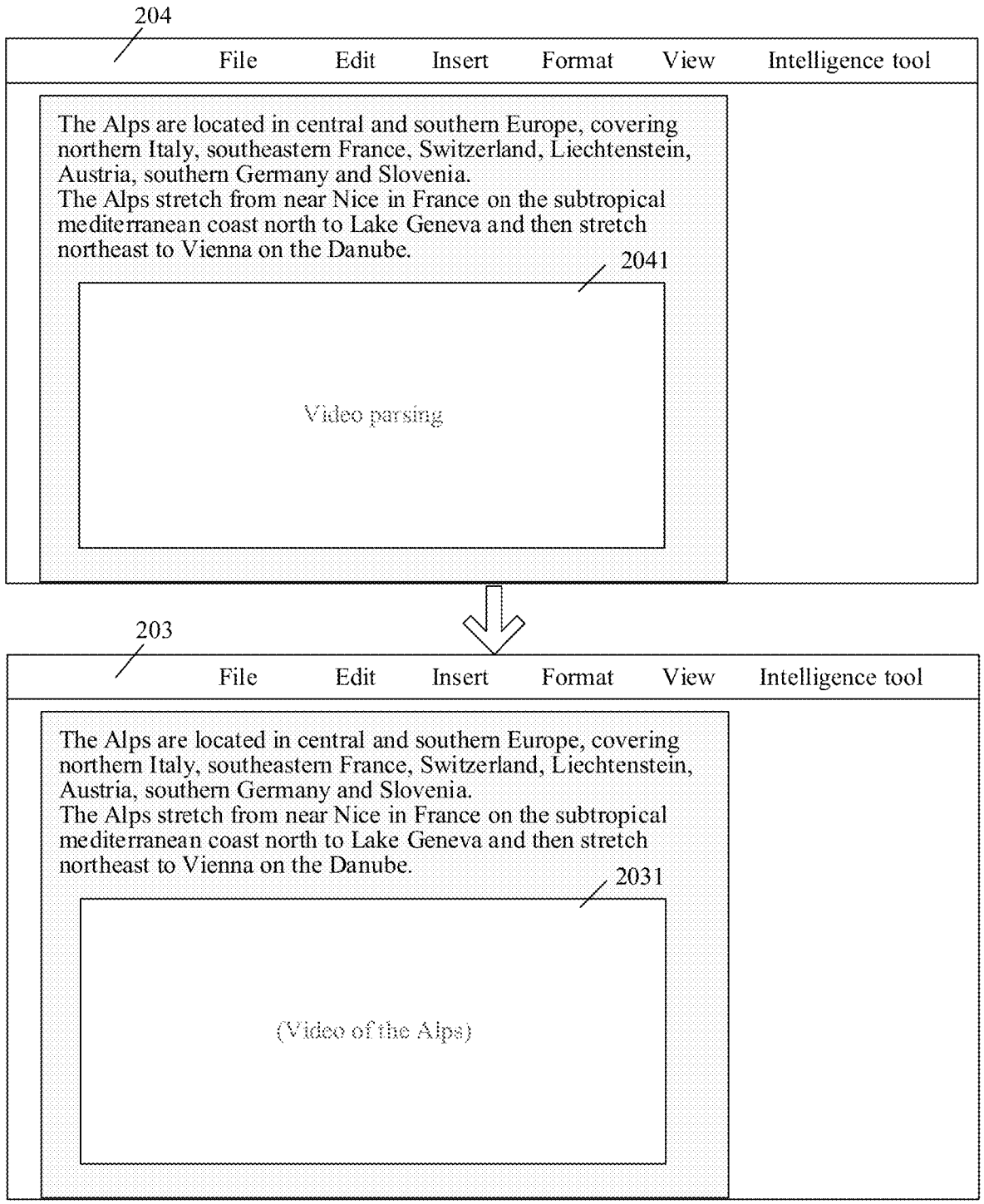
FIG. 2B is another schematic diagram of inserting document insertion content into a shared document page according to an embodiment of the present disclosure.

For example, after the user inputs the link address information through the shared document page indicated by 202 in FIG. 2A, the shared document page is shown as 204 in FIG. 2B, and 2041 represents an inline component. Loading prompt information such as "video parsing" is displayed in the display region of the inline component. The process of video parsing is the process of acquiring content from the content platform in FIG. 3A. After the shared document platform receives the content returned from the proxy server, the content is added to the inline component of the target shared document. The shared document page indicated by 204 changes into the shared document page indicated by 203. In the page 203, document insertion content, that is, a video "the Alps" is added to the inline component.

In an optional example, the content insertion subpage may further include a text description information editing control. The control may be configured for the user to set text description information linked to link address information. In this solution, the description information of the document insertion content includes the document insertion content, the link address information, and the text description information linked to the link address information.

In some embodiments, the step "acquiring link address information edited through the content insertion subpage, and acquiring description information of document insertion content to which the link address information is linked" may include:

acquiring link address information edited through the content insertion subpage;

acquiring the text description information inputted through the text description information editing control, and linking the text description information to the link address information;

acquiring content corresponding to the link address information as the document insertion content; and inserting the text description information and the document insertion content into the shared document page.

Figure 2C:
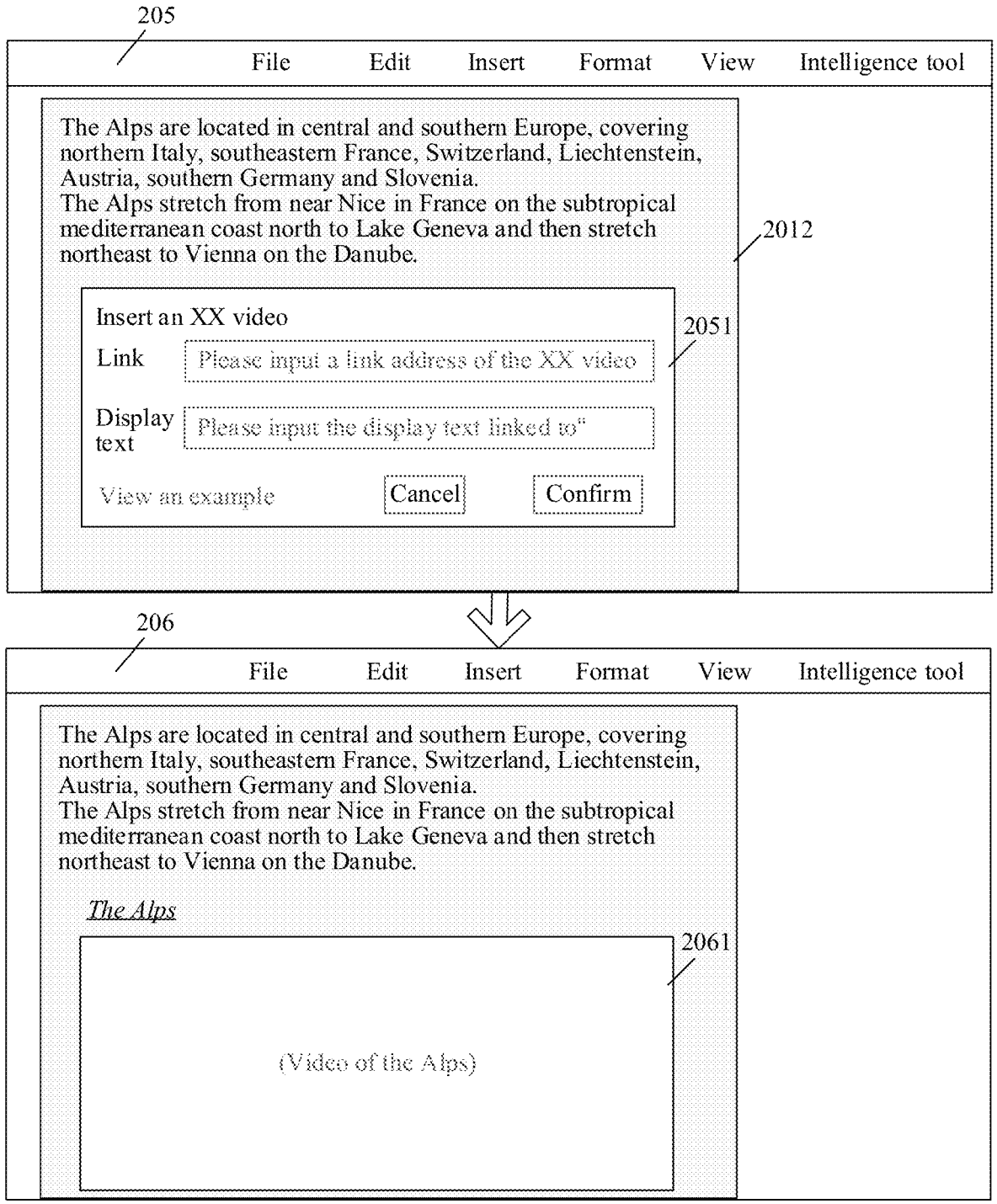
FIG. 2C is another schematic diagram of inserting document insertion content into a shared document page according to an embodiment of the present disclosure.

For example, referring to FIG. 2C, a page 205 in FIG. 2C corresponds to the page 202 in FIG. 2A, and 2051 in FIG. 2C is another content insertion subpage. The subpage 2051 includes a link input control and a text description information editing control. Link input prompt information such as "Please input link address information of XX video" is displayed in the link input control, and text input prompt information such as "Please input the display text linked to" may be displayed in the text description information.

After the link address information and text description information inputted through the subpage 2051 are acquired, the shared document page shown in 206 may be displayed. This page includes the text description information "the Alps" linked with the link address information, and a video displayed in the inline component 2061.

When a triggering operation such as a click operation on text description information such as "the Alps" is detected, a web page corresponding to the link address information linked to the text description information may be jumped to and displayed. For example, jump to a web page corresponding to link address information on an XX video platform.

For example, even if link address information and text description information are set based on the subpage 2051, the shared document page indicated by 203 may be only displayed.

102: In response to detecting an editing operation on the description information of the document insertion content, display a link editing page of the document insertion content.

In some embodiments, the editing operation may be an operation such as a click operation, a double-click operation, or a long-press operation, which is not limited in this embodiment.

For example, in some embodiments, the step "in response to an editing operation on the description information of the document insertion content, displaying a link editing page of the document insertion content" may include:

in response to detecting a triggering operation on the description information of the document insertion content for content editing, displaying a content editing subpage on the shared document page the content editing subpage including a content editing control of the document insertion content; and in response to detecting a triggering operation on the content editing control, displaying the link editing page of the document insertion content.

The link editing page may be displayed in the form of a window, a floating layer, or the like, which is not limited in this embodiment.

The link editing page in this embodiment is a page on which the user can input target link address information.

In some embodiments, for example, the link editing page may be displayed through a shortcut key operation, and the step "in response to an editing operation on the description information of the document insertion content, displaying a link editing page of the document insertion content" may include:

in response to detecting a preset shortcut editing operation on the description information of the document insertion content, displaying an editing control list including a link edition triggering control; and in response to a triggering operation on the link edition triggering control, displaying the link editing page of the document insertion content.

The preset shortcut editing operation may be triggered by an information input device such as a keyboard or a mouse. In some embodiments, the preset shortcut editing operation may be a right-click operation of a mouse on the target shared document.

For example, the step "in response to an editing operation on the description information of the document insertion content, displaying a link editing page of the document insertion content" may further include:

in response to an edition triggering operation on the description information of the document insertion content, displaying a content editing subpage on the shared document page, the content editing subpage including a content editing control of the document insertion content; and in response to a triggering operation on the content editing control, displaying the link editing page of the document insertion content.

The edition triggering operation may be an operation such as a click operation, a double-click operation, or a long-press operation on the description information of the document insertion content.

Figure 2D:
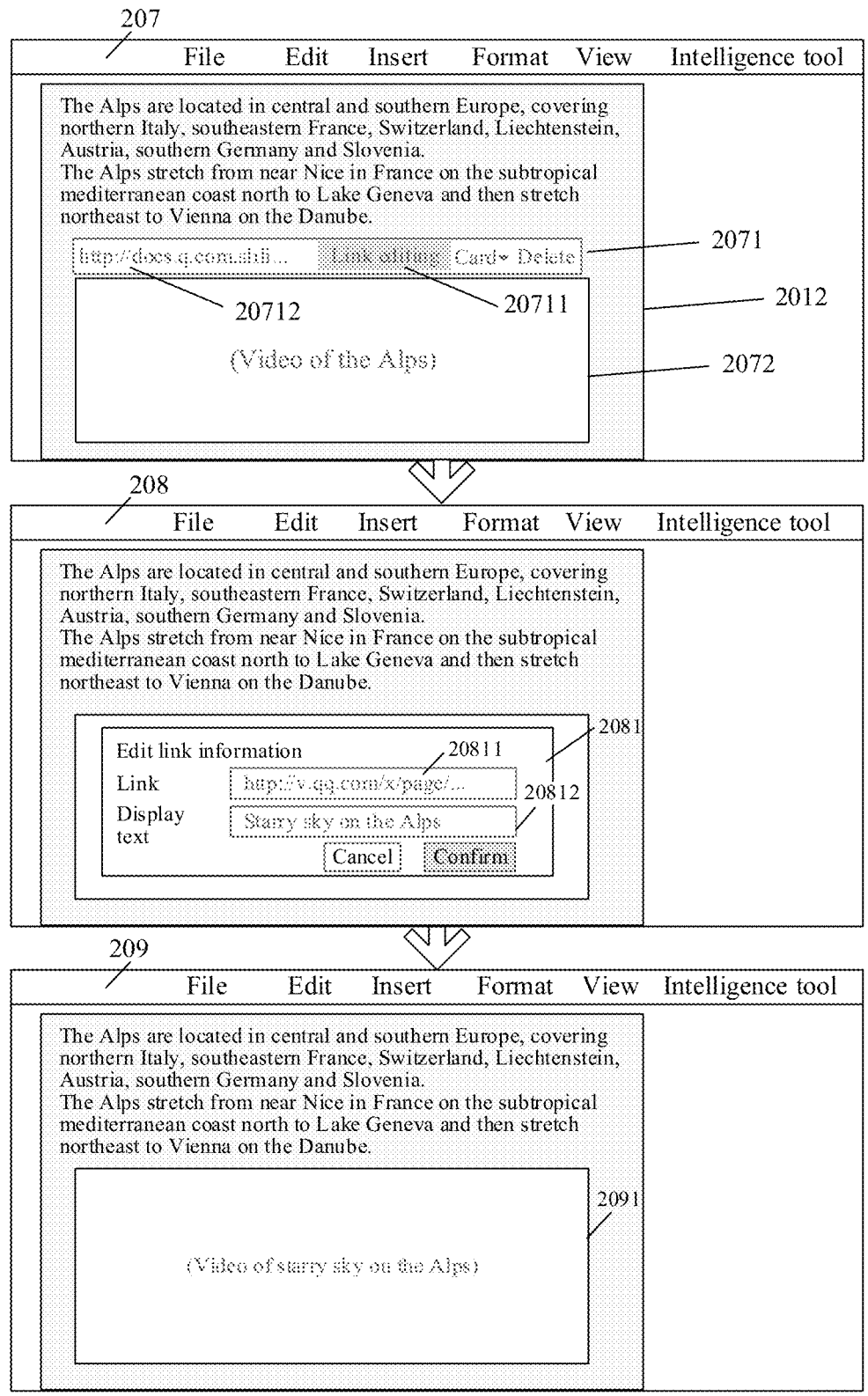
FIG. 2D is a schematic diagram of updating document insertion content on a shared document page according to an embodiment of the present disclosure.

For example, referring to FIG. 2D, a page indicated by 207 is a shared document page, and the page includes a target shared document 2012. The target shared document 2012 includes document insertion content 2072. In response to detecting a triggering operation for content editing, such as a click operation on the document insertion content 2072, a content editing subpage 2071 is displayed on the shared document page 207. The content editing subpage 2071 includes a content editing control of the document insertion content, for example, a control 20711 named "Link editing". When a triggering operation on the content editing control 20711 is detected, the link editing page of the document insertion content (referring to the window indicated by 2081 in the shared document page indicated by 208 in FIG. 2D) is displayed.

The link editing page may include a link address input control, and may further include a text editing control and an editing completion control.

The user may input the target link address information through the link address input control, and input target text description information through the text editing control.

103: Acquire target link address information edited through the link editing page.

In the solution of the link address input control, step 103 may specifically include: acquiring the target link address information edited through the link address input control.

The link editing page may include an editing completion control, and the acquiring the target link address information edited through the link address input control may include: when an input operation on the link address input control is detected, acquiring input information inputted into the link address input control; and when a confirmation operation on the editing completion control is detected, determining the acquired input information as the target link address information.

In an optional example, the link editing page may further include a text editing control and an editing completion control; the method further includes:

in response to detecting a text description information editing operation on the text editing control, acquiring target text description information to which the target link address information is linked; and the updating the document insertion content to target content corresponding to the target link address information includes:

in response to detecting a triggering operation on the editing completion control, updating the document insertion content to the target content corresponding to the target link address information, and updating the description information according to the target text description information.

If text description information of document inline content (linked to the link address information) is originally displayed in the target shared document, the updating the description information according to the target text description information may include: replacing the text description information displayed in the target shared document with the target text description information (linked to the target link address information). If no text description information of document inline content (linked to the link address information) is displayed in the target shared document, the updating the description information according to the target text description information may include: displaying the target text description information (linked to the target link address information) in the target shared document.

For example, referring to FIG. 2D, a link editing page 2081 is displayed on the shared document page 208 in FIG. 2D, and the link editing page 2081 includes a link address input control 20811, a text editing control 20812, and a confirmation completion control such as a control named "Confirm". Target link address information edited through the link address input control 20811, such as http://v.qq.com/x/page/ . . . is acquired, and in response to a text description information editing operation on the text editing control 20812, target text description information such as "starry sky on the Alps" linked to the target link address information is acquired, and in response to detecting a triggering operation on the "confirm" control, the document insertion content in 2072 is updated to the target content corresponding to the target link address information (referring to 2091 in a page indicated by 209).

For example, even if the target text description information is set, the target text description information may not be displayed on the shared document page (referring to the page indicated by 209).

Figure 2E:
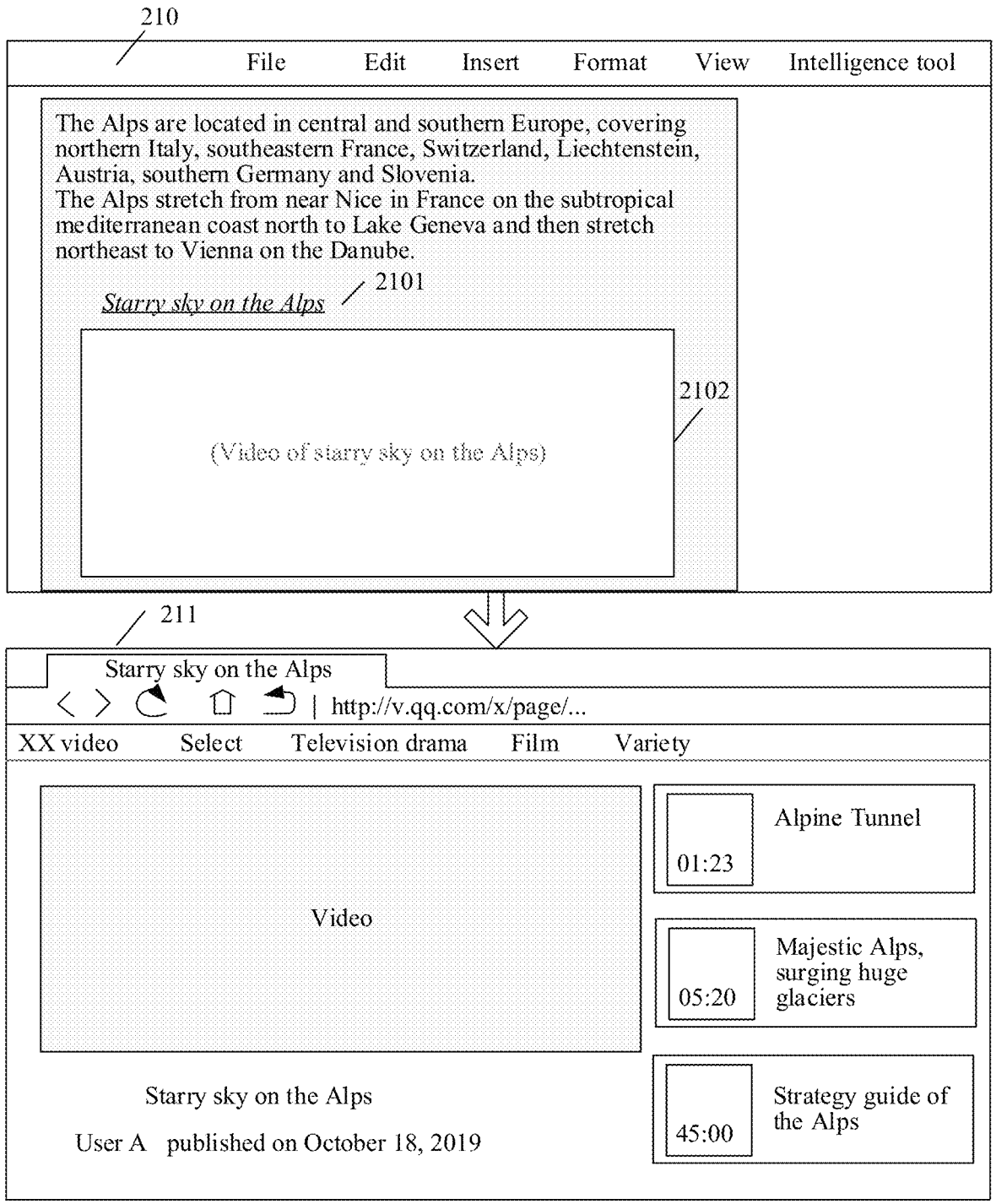
FIG. 2E is a schematic diagram of jumping to a content website page through a shared document page according to an embodiment of the present disclosure.

In another example, after the target text description information and target link address information are set, the shared document page is shown as 210 in FIG. 2E, including target text description information 2101 (linked to the target link address information) corresponding to the target content and target content 2102 with which the document insertion content is replaced.

When a content display operation on the target text description information is detected, a page indicated by 211 is displayed, the page being a web page corresponding to the target link address information to which the target text description information is linked.

For example, the content editing subpage further includes a link presentation region, the link presentation region including link address information of the document insertion content. In this embodiment, the link address information in the link presentation region can be directly edited to update the document insertion content.

In some embodiments, the method in this embodiment may further include: acquiring the target link address information inputted in the link presentation region through an information editing operation in a case that the information editing operation on the link address information of the document insertion content is detected; and updating the document insertion content to target content corresponding to the target link address information.

For example, referring to FIG. 2D, the content editing subpage indicated at 2071 further includes a link presentation region 20712. The link presentation region 20712 includes the link address information of the document insertion content. The user may select the link address information in the link presentation region and directly replace the link address information with the target link address information, or may first delete the link address information, and then input the target link address information. Subsequently, the shared document platform updates the document insertion content to the target content corresponding to the target link address information.

104: Update the document insertion content to target content corresponding to the target link address information.

In some embodiments, in this embodiment, step 104 may specifically include:

acquiring target inline link address information of the target link address information on a corresponding content platform;

acquiring target content corresponding to the target inline link address information; and updating the document insertion content to the target content corresponding to the target inline link address information.

The acquiring target inline link address information of the target link address information on a corresponding content platform may include: converting, according to an inline link generation rule of the content platform to which the target link address information belongs and according to types, the target link address information into target inline link address information of the content platform that can be inserted into other platforms (such as the shared document platform).

Specifically, the target link address information may be transmitted to the corresponding content platform, to trigger the content platform to convert, according to its own inline link generation rule, the target link address information into target inline link address information of the content platform that can be inserted into other platforms (such as the shared document platform).

In this embodiment, the step of acquiring target content corresponding to the target inline link address information may include:

accessing the content platform corresponding to the target inline link address information based on the target inline link address information; and acquiring target content corresponding to the target inline link address information from the content platform.

For example, before the step "acquiring target inline link address information of the target link address information on a corresponding content platform", the method may further include:

detecting whether the target link address information is link address information of a target content platform;

if yes, continuing to perform the step of acquiring target inline link address information of the target link address information on a corresponding content platform; and if not, displaying content insertion failure prompt information on the shared document page.

For the specific solution of detecting whether the target link address information is link address information of the target content platform, reference may be made to the solution of "detecting whether the link address information is link address information of the target content platform" in the foregoing content, and details are not described herein again.

For example, the target inline link address information and inline link address information may be limited to inline link address information of the same content platform. If the content platforms corresponding to the target inline link address information and the inline link address information are different, it can be considered that the target inline link address information is not link address information of the target content platform, so as to ensure that all content comes from the same content platform before and after the document insertion content is updated.

In another example, content platforms corresponding to the target inline link address information and the inline link address information may be different.

In some embodiments, in this embodiment, for the solution of inserting content of a content platform such as document insertion content and target content into a shared document by using an inline component, the document insertion content in the inline component may be replaced directly. In some embodiments, the step "updating the document insertion content to the target content corresponding to the target inline link address information" may include:

updating the document insertion content to the target content corresponding to the target inline link address information in the inline component.

It may be understood that the link address information of the document insertion content in the inline component is further replaced with the target link address information of the target content.

In another example, the inline component in which the document insertion content is located may be deleted, and then a new inline component is generated for the target content to be inserted.

In some embodiments, the step "updating the document insertion content to the target content corresponding to the target inline link address information" may include:

deleting the inline component of the document insertion content; and generating a new inline component in the target shared document, and inserting the description information of the target content corresponding to the target inline link address information into the new inline component.

The description information of the target content may include the target content, target link address information of the target content, source information of the target content, and the like.

In another example, the shared document platform may be provided with a proxy server, and access a content platform through the proxy server. The description information of the document insertion content in the inline component may include: the document insertion content and link address information of the document insertion content.

In some embodiments, the step "acquiring target content corresponding to the target inline link address information" may include:

converting the target inline link address information into target document inline link address information, the target document inline link address information being address information that a proxy server responds to;

transmitting a content acquisition request including the target document inline link address information to the proxy server, to trigger the proxy server to: acquire the target inline link address information from the target document inline link address information, and acquire the target content from the corresponding content platform based on the target inline link address information; and receiving the target content transmitted by the proxy server.

Correspondingly, the step "updating the document insertion content to the target content corresponding to the target inline link address information in the inline component" may include:

updating the link address information of the document insertion content to the target link address information and updating the document insertion content to the target content in the inline component.

The converting the target inline link address information into the target document inline link address information may be adding directional information of the proxy server to the target inline link address information. The directional information may be used for instructing the terminal to transmit the target document inline link address information to the proxy server.

In some embodiments, the proxy server may also perform certain filtering on the received inline link address information according to certain rules, to avoid inserting content not supported by relational document platforms into the shared document.

In some embodiments, the step "transmitting a content acquisition request including the target document inline link address information to the proxy server, to trigger the proxy server to: acquire the target inline link address information from the target document inline link address information, and acquire the target content from the corresponding content platform based on the target inline link address information" may include:

transmitting the content acquisition request including the target document inline link address information to the proxy server, to trigger the proxy server to: acquire the target inline link address information from the target document inline link address information, determine, based on a preset inline link filtering rule, whether the target inline link address information is inline link address information that meets a constraint condition, and acquire, in a case that it is determined that the target inline link address information is inline link address information that meets the constraint condition, the target content from the corresponding content platform based on the target inline link address information.

For the preset inline filtering rule, reference may be made to the description in the foregoing content. The preset inline filtering rule may be set according to the target content platform supported by the shared document platform, for example, determining the inline link address information of the target content platform as inline link address information that meets the constraint condition, and determining inline link address information that does not belong to the target content platform as inline link address information that does not meet the constraint condition. In this embodiment, the proxy server intercepts invalid inline link address information, and transmits link abnormality information to the terminal after the interception, to trigger the terminal to display link abnormality prompt information on the shared document page, the link abnormality prompt information being used for prompting that the target content is not content that the shared document platform supports to be inserted into the target shared document.

The steps of updating the document insertion content are described below in detail with reference to FIG. 3B.

Figure 3B:
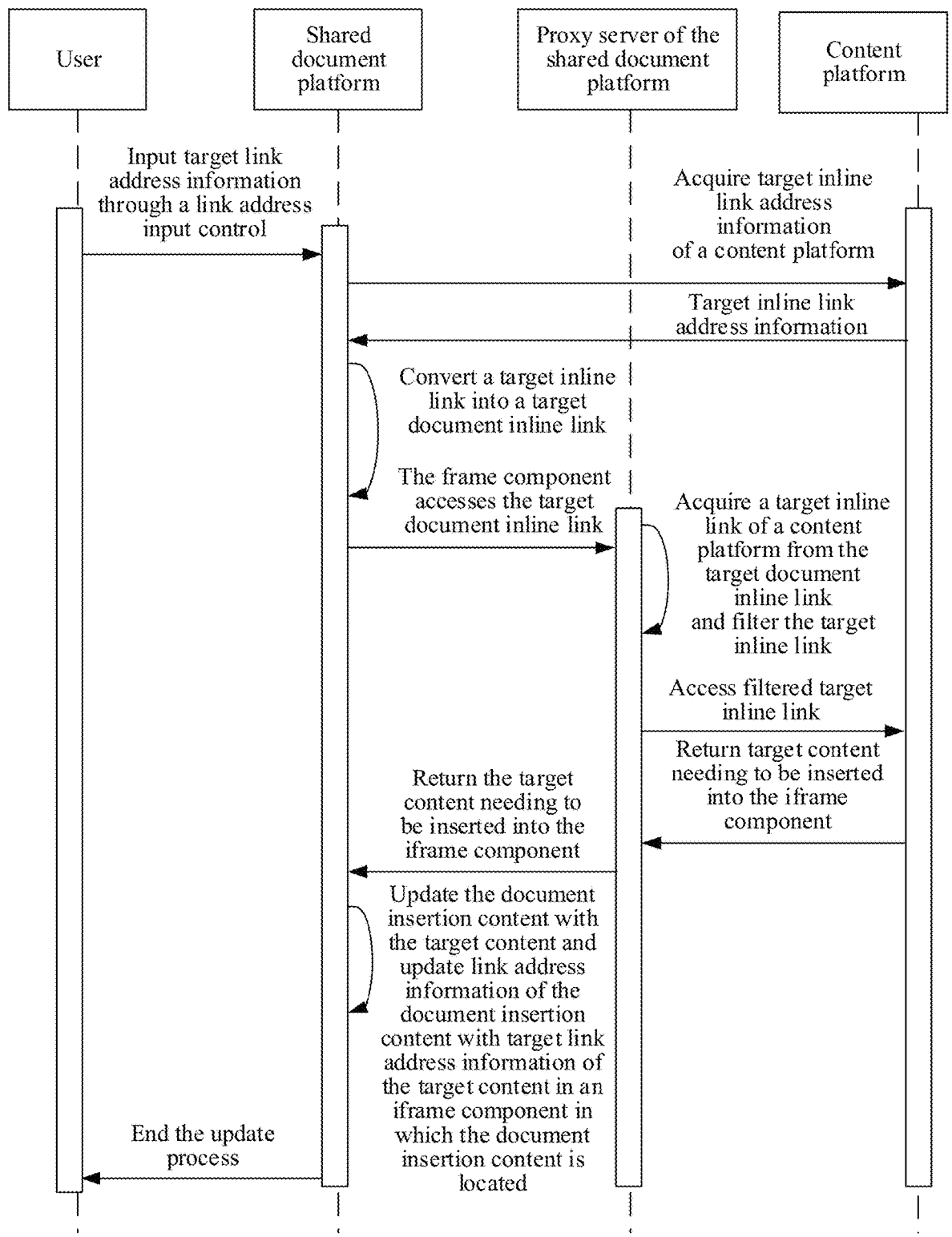
FIG. 3B is a schematic flowchart of updating document insertion content on a shared document page according to an embodiment of the present disclosure.

Referring to FIG. 3B, after the target link address information is updated through the link address input control in the target shared document, the update solution of the document insertion content may include:

after the user inputs the target link address information through the link address input control, accessing, by the shared document platform, a content platform corresponding to the target link address information based on the target link address information, to acquire target inline link address information corresponding to the target link address information from the content platform;

converting, by the shared document platform, the target inline link address information into target document inline link address information, the target document inline link address information being link address information that can be responded, parsed, and processed by a proxy server;

transmitting a content acquisition request including the target document inline link address information to the proxy server;

parsing, by the proxy server, the target inline link address information of the content platform from the target document inline link address information;

determining, by the proxy server based on a preset inline link filtering rule, whether the target inline link address information is inline link address information that meets a constraint condition, and acquiring, in a case that it is determined that the target inline link address information is inline link address information that meets the constraint condition and based on the target inline link address information, target content needing to be inserted into the inline component from the content platform;

transmitting, by the proxy server, the target content needing to be inserted into the inline component to the shared document platform; and receiving, by the shared document platform, the target content, and replacing the document insertion content with the target content and replacing the link address information of the document insertion content with the target link address information of the content in the inline component in which the document insertion content is located.

After the inline component is updated by the shared document platform, data of the shared document page may be transmitted to the terminal, for the terminal to display the updated shared document page.

By applying this embodiment of this application, a shared document page may be displayed, the shared document page including content of a target shared document and description information of document insertion content, the target shared document being capable of being operated simultaneously or non-simultaneously by at least two users having permissions, the target shared document and the document insertion content being from different content platforms; a link editing page of the document insertion content may be displayed in response to detecting an editing operation on the description information of the document insertion content; target link address information edited through the link editing page may be acquired; and the document insertion content may be updated to target content corresponding to the target link address information. In this way, a user can update the document insertion content without deleting the document insertion content, which avoids cumbersome operations caused by first deletion and subsequent addition on the document insertion content in the related art, and reduces the possibility of an erroneous deletion caused by the deletion operation.

Figure 4:
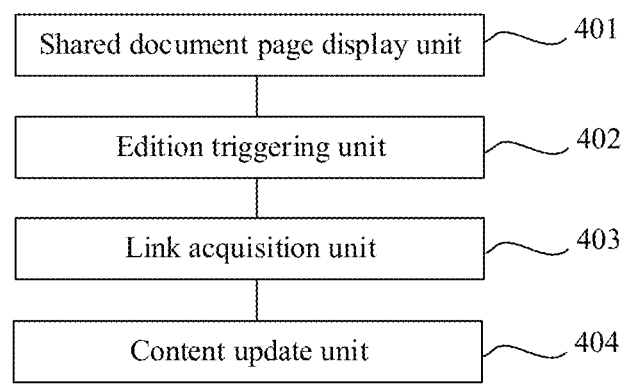
FIG. 4 is a schematic structural diagram of a document editing apparatus according to an embodiment of the present disclosure.

To better implement the foregoing method, correspondingly, an embodiment of the present disclosure further provides a document editing apparatus. Referring to FIG. 4, the document editing apparatus includes:
- a shared document page display unit 401, configured to display a shared document page, the shared document page including content of a target shared document and description information of document insertion content, the target shared document being capable of being operated simultaneously or non-simultaneously by at least two users having permissions, the target shared document and the document insertion content being from different content platforms;
- an edition triggering unit 402, configured to display a link editing page of the document insertion content in response to detecting an editing operation on the description information of the document insertion content;
- a link acquisition unit 403, configured to acquire target link address information edited through the link editing page; and
- a content update unit 404, configured to update the document insertion content to target content corresponding to the target link address information.

In some embodiments, the edition triggering unit is configured to:
- display a content editing subpage on the shared document page in response to detecting an edition triggering operation on the description information of the document insertion content, the content editing subpage including a content editing control of the document insertion content; and
- display the link editing page of the document insertion content in response to detecting a triggering operation on the content editing control.

In some optional examples, the content editing subpage further includes a link presentation region, the link presentation region including link address information of the document insertion content; and the apparatus further includes:
- a link address information acquisition unit, configured to acquire the target link address information inputted in the link presentation region through an information editing operation in response to detecting the information editing operation on the link address information of the document insertion content; and
- a target content update unit, configured to update the document insertion content to the target content corresponding to the target link address information.

In some embodiments, the link editing page includes a link address input control; and
the link acquisition unit is configured to:
acquire the target link address information edited through the link address input control.

In some embodiments, the link editing page further includes a text editing control and an editing completion control; the apparatus further includes:
- a text description information acquisition unit, configured to acquire, in response to detecting a text description information editing operation on the text editing control, target text description information to which the target link address information is linked; and
- the content update unit is configured to:
  in response to detecting a triggering operation on the editing completion control, update the document insertion content to the target content corresponding to the target link address information, and update the description information according to the target text description information.

In some embodiments, the shared document page includes an insertion content presentation region, the insertion content presentation region including the description information of the document insertion content; and
the apparatus further includes:
- a content presentation unit, configured to present the document insertion content within the insertion content presentation region in response to detecting a content presentation operation on the description information of the document insertion content.

In some embodiments, the shared document page display unit is configured to:
- display the shared document page, the shared document page including the content of the target shared document;
- in response to a content insertion operation on the target shared document, display a content platform list on the shared document page, the content platform list including at least one candidate content platform;
- in response to a selection operation on a target content platform, display a content insertion subpage;
- acquire link address information edited through the content insertion subpage, and acquire description information of document insertion content to which the link address information is linked; and
- insert the description information of the document insertion content into the shared document page.

In some embodiments, the shared document page includes a content insertion control; and
the shared document page display unit is configured to:
- in response to detecting a content insertion operation on the content insertion control, display a content insertion management control list on the shared document page, the content insertion management control list including a content platform selection control; and
- in response to detecting a triggering operation on the content platform selection control, display the content platform list on the shared document page.

In some embodiments, the content update unit is configured to:

acquire target inline link address information of the target link address information on a corresponding content platform;

acquire target content corresponding to the target inline link address information; and update the document insertion content to the target content corresponding to the target inline link address information.

In some embodiments, the content update unit is configured to: in accordance with a determination that the target link address information is link address information of a target content platform, continue to perform the operation of acquiring target inline link address information of the target link address information on a corresponding content platform; and in accordance with a determination that the target link address information is not link address information of the target content platform, display content insertion failure prompt information on the shared document page.

In some embodiments, the target shared document includes an inline component, and the description information of the document insertion content is inserted into the target shared document by using the inline component; and the content update unit is configured to:

update the document insertion content to the target content corresponding to the target inline link address information in the inline component.

In some embodiments, the description information of the document insertion content in the inline component includes: the document insertion content and link address information of the document insertion content;

the content update unit is configured to:

convert the target inline link address information into target document inline link address information, the target document inline link address information being address information that a proxy server responds to;

transmit a content acquisition request including the target document inline link address information to the proxy server, to trigger the proxy server to: acquire the target inline link address information from the target document inline link address information, and acquire the target content from the corresponding content platform based on the target inline link address information; and receive the target content transmitted by the proxy server; and update the link address information of the document insertion content to the target link address information and update the document insertion content to the target content in the inline component.

In some embodiments, the content update unit is configured to:

transmit the content acquisition request including the target document inline link address information to the proxy server, to trigger the proxy server to: acquire the target inline link address information from the target document inline link address information, determine, based on a preset inline link filtering rule, whether the target inline link address information is inline link address information that meets a constraint condition, and acquire, in accordance with a determination that the target inline link address information meets the constraint condition, the target content from the corresponding content platform based on the target inline link address information.

By using the apparatus in this embodiment of this application, a user can update document insertion content without deleting the document insertion content, which avoids cumbersome operations caused by first deletion and subsequent addition on the document insertion content in the related art, and reduces the possibility of an erroneous deletion caused by the deletion operation.

Figure 5:
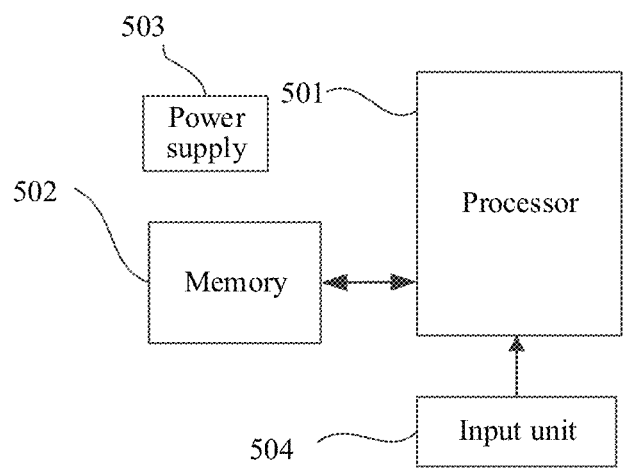
FIG. 5 is a schematic structural diagram of a computer device according to an embodiment of the present disclosure.

In addition, an embodiment of the present disclosure further provides a computer device, and the computer device may be a terminal or a server. FIG. 5 is a schematic structural diagram of a computer device according to an embodiment of the present disclosure. Specifically:

the computer device may include components such as a processor 501 including one or more processing cores, a memory 502 including one or more computer-readable storage media, a power supply 503, and an input unit 504. A person skilled in the art may understand that, the structure of the computer device shown in FIG. 5 does not constitute a limitation to the computer device. The computer device may include components that are more or fewer than those shown in the figure, or some components may be combined, or a different component deployment may be used.

The processor 501 is a control center of the computer device, and connects to various parts of the entire computer device by using various interfaces and lines. By running or executing software programs and/or modules stored in the memory 502, and invoking data stored in the memory 502, the processor performs various functions and data processing of the computer device, thereby performing overall monitoring on the computer device. In some embodiments, the processor 501 may include one or more processing cores. Exemplarily, the processor 501 may integrate an application processor and a modem processor. The application processor mainly processes an operating system, a user interface, an application, and the like, and the modem processor mainly processes wireless communication. It may be understood that alternatively, the modem processor may not be integrated into the processor 501.

The memory 502 may be configured to store a software program and module, and the processor 501 runs the software program and module stored in the memory 502, to implement various functional applications and data processing. The memory 502 may mainly include a program storage area and a data storage area. The program storage area may store an operating system, an application required by at least one function (for example, a sound playback function and an image display function), and the like. The data storage area may store data created according to use of the computer device, and the like. In addition, the memory 502 may include a high-speed random access memory, and may further include a non-volatile memory, such as at least one magnetic disk storage device, a flash memory, or another volatile solid-state storage device. Correspondingly, the memory 502 may further include a memory controller, to allow the processor 501 to access the memory 502.

The computer device further includes the power supply 503 for supplying power to the components. Exemplarily, the power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other component.

The computer device may further include the input unit 504. The input unit 504 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 501 in the computer device may load executable files corresponding to processes of one or more applications to the memory 502 according to the following instructions, and the processor 501 runs the application stored in the memory 502, to implement various functions as follows:

displaying a shared document page, the shared document page including content of a target shared document and description information of document insertion content, the target shared document being capable of being operated simultaneously or non-simultaneously by at least two users having permissions, the target shared document and the document insertion content being from different content platforms;

in response to detecting an editing operation on the description information of the document insertion content, displaying a link editing page of the document insertion content;

acquiring target link address information edited through the link editing page; and updating the document insertion content to target content corresponding to the target link address information.

For specific implementations of the above operations, refer to the foregoing embodiments. Details are not described herein again.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of the present disclosure further provides a storage medium, storing a plurality of instructions, the instructions being capable of being loaded by a processor, to perform the document editing method provided in the embodiments of the present disclosure.

According to an aspect of this application, a computer program product or a computer program is further provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the method provided in the various optional implementations in the foregoing embodiments.

For specific implementations of the above operations, refer to the foregoing embodiments. Details are not described herein again.

The storage medium may include a read-only memory (ROM), a random access memory (RAM), a magnetic disk, an optical disc, or the like.

Because the instructions stored in the storage medium may perform the steps of the document editing method provided in the embodiments of the present disclosure, the instructions can implement beneficial effects that may be implemented by the document editing method provided in the embodiments of the present disclosure. For details, reference may be made to the foregoing embodiments. Details are not described herein again.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The document editing method and apparatus, the computer device, and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. A document editing method, performed by a computer device, the method comprising:

displaying a shared document page comprising content of a target shared document;

in response to detecting a content insertion operation on the target shared document, displaying a content platform list on the shared document page, the content platform list comprising a plurality of candidate content platforms;

in response to detecting a selection operation on a target content platform among the plurality of candidate content platforms, displaying a content insertion subpage;

acquiring, from the target content platform, link address information edited through the content insertion subpage and description information of document insertion content to which the link address information is linked;

inserting the description information of the document insertion content into the shared document page;

in response to an editing operation on the description information of the document insertion content, displaying a link editing page of the document insertion content;

acquiring target link address information edited through the link editing page;

acquiring target inline link address information of the target link address information on the corresponding content platform;

acquiring target content corresponding to the target inline link address information; and updating the document insertion content to the target content corresponding to the target inline link address information.

2. The document editing method according to claim 1, wherein displaying the link editing page of the document insertion content comprises:

in response to detecting a triggering operation on the description information of the document insertion content for content editing, displaying a content editing subpage on the shared document page, the content editing subpage comprising a content editing control of the document insertion content; and in response to detecting a triggering operation on the content editing control, displaying the link editing page of the document insertion content.

3. The document editing method according to claim 2, wherein the content editing subpage further comprises a link presentation region, the link presentation region comprising link address information of the document insertion content; and the method further comprising:

in response to detecting an information editing operation on the link address information of the document insertion content, acquiring the target link address information inputted in the link presentation region; and updating the document insertion content to the target content corresponding to the target link address information.

4. The document editing method according to claim 1, wherein the link editing page comprises a link address input control; and the acquiring target link address information edited through the link editing page comprises:

acquiring the target link address information edited through the link address input control.

5. The document editing method according to claim 4, wherein the link editing page further comprises a text editing control and an editing completion control; the method further comprising:

in response to detecting a text description information editing operation on the text editing control, acquiring target text description information to which the target link address information is linked; and updating the document insertion content to target content corresponding to the target link address information comprises:

in response to detecting a triggering operation on the editing completion control, updating the document insertion content to the target content corresponding to the target link address information, and updating the description information of the document insertion content according to the target text description information.

6. The document editing method according to claim 1, wherein the shared document page comprises a content insertion control; and displaying a content platform list on the shared document page comprises:

in response to detecting a content insertion operation on the content insertion control, displaying a content insertion management control list on the shared document page, the content insertion management control list comprising a content platform selection control; and in response to detecting a triggering operation on the content platform selection control, displaying the content platform list on the shared document page.

7. The document editing method according to claim 1, wherein before acquiring the target inline link address information of the target link address information on the corresponding content platform, the method further comprises:

in accordance with a determination that the target link address information is link address information of a target content platform, continuing to acquire target inline link address information of the target link address information on a corresponding content platform; and in accordance with a determination that the target link address information is not link address information of the target content platform, displaying content insertion failure prompt information on the shared document page.

8. The document editing method according to claim 1, wherein the target shared document comprises an inline component, and the description information of the document insertion content is inserted into the target shared document by using the inline component; and updating the document insertion content to the target content corresponding to the target inline link address information comprises:

updating the document insertion content to the target content corresponding to the target inline link address information in the inline component.

9. The document editing method according to claim 1, wherein the description information of the document insertion content in the inline component comprises: the document insertion content and link address information of the document insertion content; and acquiring target content corresponding to the target inline link address information comprises:

converting the target inline link address information into target document inline link address information comprising address information that a proxy server responds to;

transmitting a content acquisition request comprising the target document inline link address information to the proxy server, to trigger the proxy server to: acquire the target inline link address information from the target document inline link address information, and acquire the target content from the corresponding content platform based on the target inline link address information; and receiving the target content transmitted by the proxy server; and the updating the document insertion content to the target content corresponding to the target inline link address information in the inline component comprises:

updating the link address information of the document insertion content to the target link address information and updating the document insertion content to the target content in the inline component.

10. The document editing method according to claim 9, wherein transmitting the content acquisition request comprises:

transmitting the content acquisition request comprising the target document inline link address information to the proxy server, to cause the proxy server to:

acquire the target inline link address information from the target document inline link address information, and in accordance with a determination, based on a preset inline link filtering rule, that the target inline link address information meets a constraint condition, acquire the target content from the corresponding content platform based on the target inline link address information.

11. An electronic device, comprising:

one or more processors; and memory storing one or more programs, the one or more programs comprising instructions that, when executed by the one or more processors, cause the one or more processors to perform operations comprising:

displaying a shared document page comprising content of a target shared document;

in response to detecting a content insertion operation on the target shared document, displaying a content platform list on the shared document page, the content platform list comprising a plurality of candidate content platforms;

in response to detecting a selection operation on a target content platform among the plurality of candidate content platforms, displaying a content insertion subpage;

acquiring, from the target content platform, link address information edited through the content insertion subpage and description information of document insertion content to which the link address information is linked;

inserting the description information of the document insertion content into the shared document page;

in response to an editing operation on the description information of the document insertion content, displaying a link editing page of the document insertion content;

acquiring target link address information edited through the link editing page;

acquiring target inline link address information of the target link address information on the corresponding content platform;

acquiring target content corresponding to the target inline link address information; and updating the document insertion content to the target content corresponding to the target inline link address information.

12. The electronic device according to claim 11, wherein displaying the link editing page of the document insertion content comprises:

in response to detecting a triggering operation on the description information of the document insertion content for content editing, displaying a content editing subpage on the shared document page, the content editing subpage comprising a content editing control of the document insertion content; and in response to detecting a triggering operation on the content editing control, displaying the link editing page of the document insertion content.

13. The electronic device according to claim 11, wherein before acquiring the target inline link address information of the target link address information on the corresponding content platform, the method further comprises:

in accordance with a determination that the target link address information is link address information of a target content platform, continuing to acquire target inline link address information of the target link address information on a corresponding content platform; and in accordance with a determination that the target link address information is not link address information of the target content platform, displaying content insertion failure prompt information on the shared document page.

14. The electronic device according to claim 11, the description information of the document insertion content in the inline component comprises: the document insertion content and link address information of the document insertion content; and acquiring target content corresponding to the target inline link address information comprises:

converting the target inline link address information into target document inline link address information comprising address information that a proxy server responds to;

transmitting a content acquisition request comprising the target document inline link address information to the proxy server, to trigger the proxy server to: acquire the target inline link address information from the target document inline link address information, and acquire the target content from the corresponding content platform based on the target inline link address information; and receiving the target content transmitted by the proxy server; and the updating the document insertion content to the target content corresponding to the target inline link address information in the inline component comprises:

updating the link address information of the document insertion content to the target link address information and updating the document insertion content to the target content in the inline component.

15. A non-transitory computer-readable storage medium, storing a computer program, the computer program, when executed by one or more processors of an electronic device, cause the one or more processors to perform operations comprising:

one or more processors; and memory storing one or more programs, the one or more programs comprising instructions that, when executed by the one or more processors, cause the one or more processors to perform operations comprising:

displaying a shared document page comprising content of a target shared document;

in response to detecting a content insertion operation on the target shared document, displaying a content platform list on the shared document page, the content platform list comprising a plurality of candidate content platforms;

in response to detecting a selection operation on a target content platform among the plurality of candidate content platforms, displaying a content insertion subpage;

acquiring, from the target content platform, link address information edited through the content insertion subpage and description information of document insertion content to which the link address information is linked;

inserting the description information of the document insertion content into the shared document page;

in response to an editing operation on the description information of the document insertion content, displaying a link editing page of the document insertion content;

acquiring target link address information edited through the link editing page;

acquiring target inline link address information of the target link address information on the corresponding content platform;

acquiring target content corresponding to the target inline link address information; and updating the document insertion content to the target content corresponding to the target inline link address information.

16. The non-transitory computer-readable storage medium according to claim 15, wherein displaying the link editing page of the document insertion content comprises:

in response to detecting a triggering operation on the description information of the document insertion content for content editing, displaying a content editing subpage on the shared document page, the content editing subpage comprising a content editing control of the document insertion content; and in response to detecting a triggering operation on the content editing control, displaying the link editing page of the document insertion content.

\* \* \* \* \*